Figure 1:
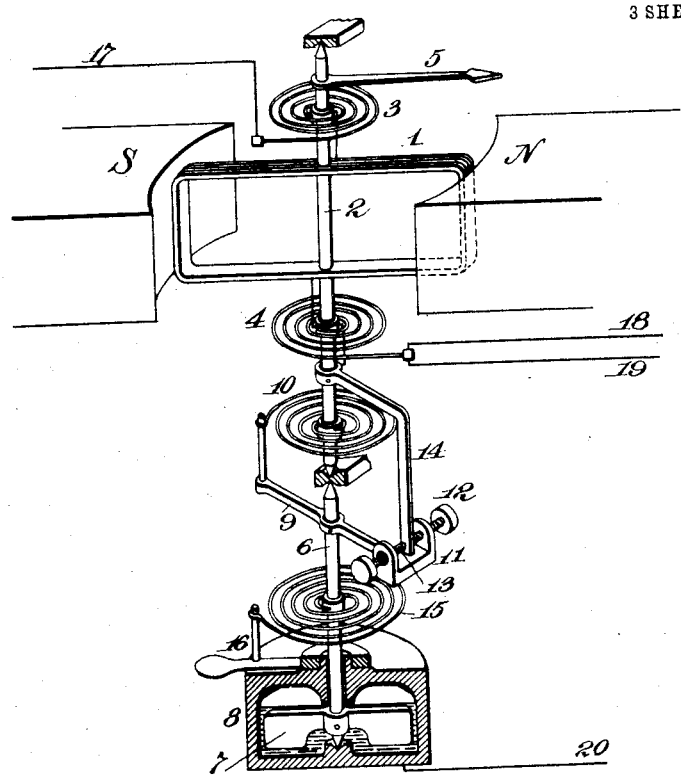

No. 786,696. PATENTED APR. 4, 1905.
F. K. VREELAND.
SIGNAL RELAY.
APPLICATION FILED NOV. 14, 1904.

3 SHEETS—SHEET 1.

Witnesses:
Jno. F. Coleman
John Hotsed.

Inventor
Frederick K. Vreeland
By Dyer & Dyer
Attorneys.

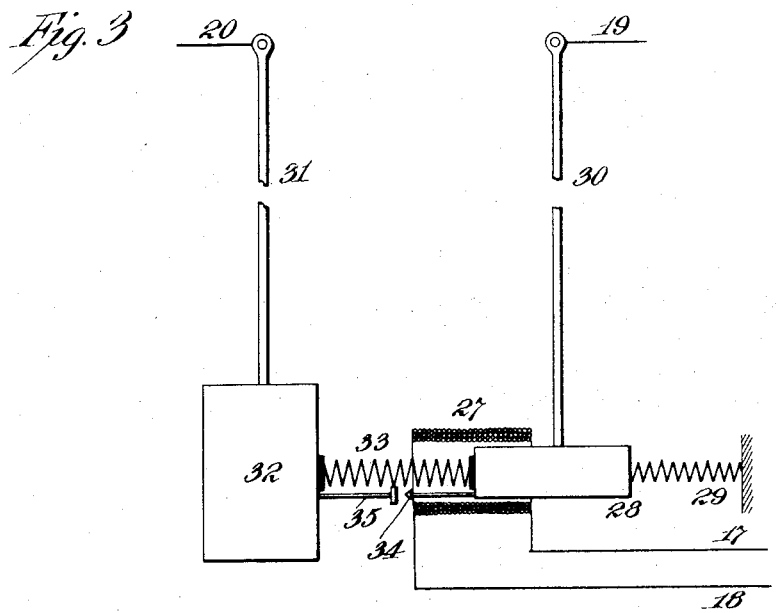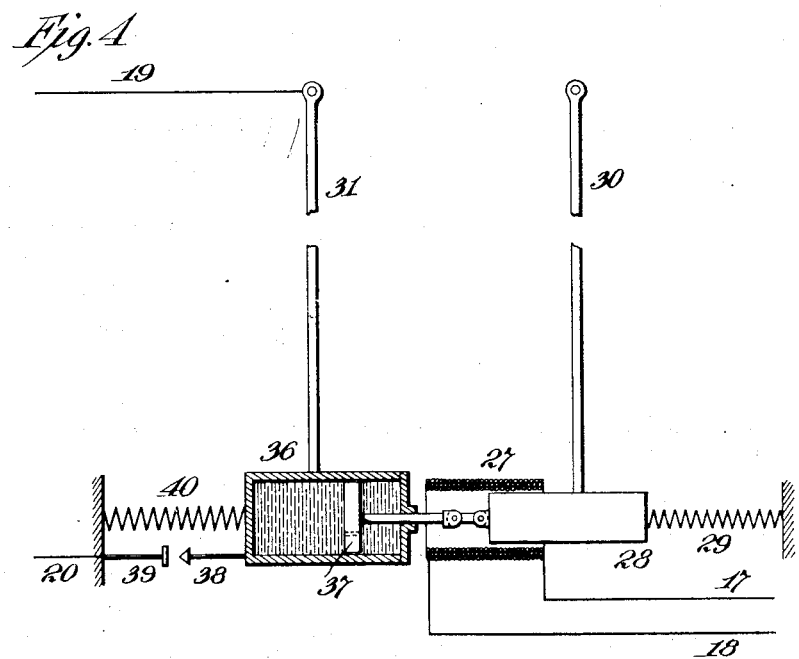

No. 786,696. PATENTED APR. 4, 1905.
F. K. VREELAND.
SIGNAL RELAY.
APPLICATION FILED NOV. 14, 1904.

3 SHEETS—SHEET 3.

Witnesses:
Jas. F. Coleman
John H. Lotsch

Inventor
Frederick K. Vreeland
By Dyer & Dyer
Attorneys.

No. 786,696.

Patented April 4, 1905.

UNITED STATES PATENT OFFICE.

FREDERICK K. VREELAND, OF MONTCLAIR, NEW JERSEY, ASSIGNOR TO WIRELESS TELEGRAPH EXPLOITATION COMPANY, OF NEW YORK, N. Y., A CORPORATION OF NEW YORK.

SIGNAL-RELAY.

SPECIFICATION forming part of Letters Patent No. 786,696, dated April 4, 1905.

Application filed November 14, 1904. Serial No. 232,592.

*To all whom it may concern:*

Be it known that I, FREDERICK K. VREELAND, a citizen of the United States, residing at Montclair, in the county of Essex and State of New Jersey, have invented a certain new and useful Improvement in Signal-Relays, of which the following is a description.

The object I have in view is to produce an effective signal-relay for continuous currents which will be responsive to sudden variations and non-responsive to gradual variations of the current.

My purpose is particularly to provide a relay for use in connection with my "polariphone-detector" for wireless telegraphs and similar purposes described in my application, Serial No. 219,016, filed August 1, 1904, so as to enable such detector to be used in conjunction with a call-bell, a tape recorder, or a simple Morse sounder. I have employed for this purpose a relay of the suspended-coil ammeter type, the needle being provided with contacts; but such an instrument is impracticable for commercial work, since the slow variations in the normal current require repeated adjustments of the contacts if the instrument is made sensitive. The current passing through the polariphone-cell is continuous, having a nearly constant normal value—*i. e.*, when the cell is not excited by the signal impulses—but increasing suddenly on the receipt of such impulses. The normal value of the current passing through the cell is, however, not absolutely constant, but varies gradually to a limited extent due to changes in the condition of the cell.

My object is to provide a relay instrument having a zero independent of the value of the normal current and which responds only to the sudden variations in that current caused by the depolarization of the cell by the signal impulses. This I accomplish by providing contacts so controlled by a light and sensitive motor element that their normal mutual relation will not be disturbed by gradual variations in the current, but so that the contacts will be moved relatively to each other to open or close a local circuit by sudden variations in the current. An instrument which will give these results may be constructed in a variety of ways. The motor element may have a rotating or oscillating movement or a rectilinear movement. It may move a contact element through a viscous coupling or dash-pot, which transmits sudden movements of the motor element to the contact element, but yields readily and without moving the contact element for slow movements of the motor element. In this case the contact element may carry the moving contact and operate in conjunction with a stationary contact or the motor element may be connected with the contact element by a resilient connection and the contact element be retarded by a viscous retarding device, or by the inertia of a weight or by the drag of a copper disk located in a strong magnetic field. In this form of the device the motor element will carry one contact and the contact element will carry the other contact of the local circuit, so that the normal mutual relation of the contacts will be maintained during gradual or slow movements of the motor element, both contacts moving together, but when the motor element moves suddenly the contacts will be moved relatively due to the retardation of the contact element.

Several forms of apparatus embodying the invention are illustrated in the accompanying drawings, in which—

Figure 2:
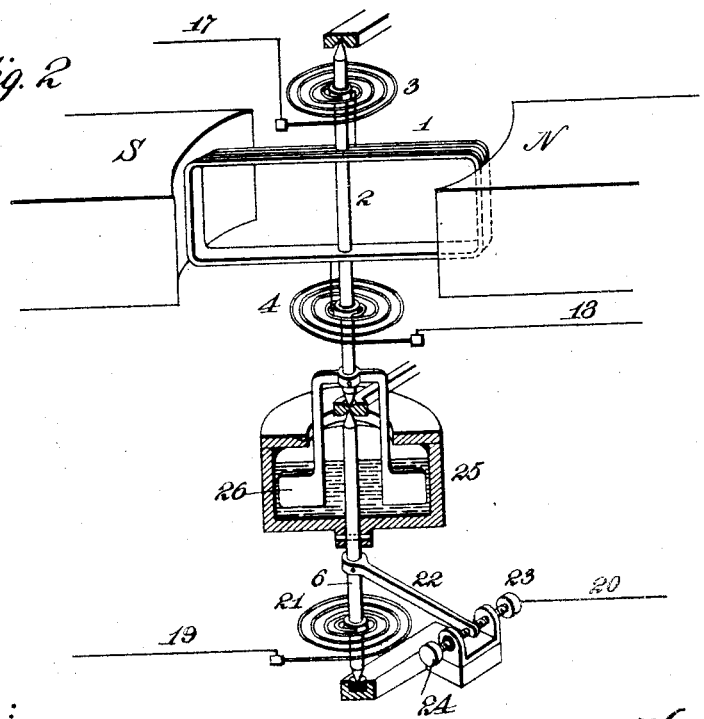
Figure 5:
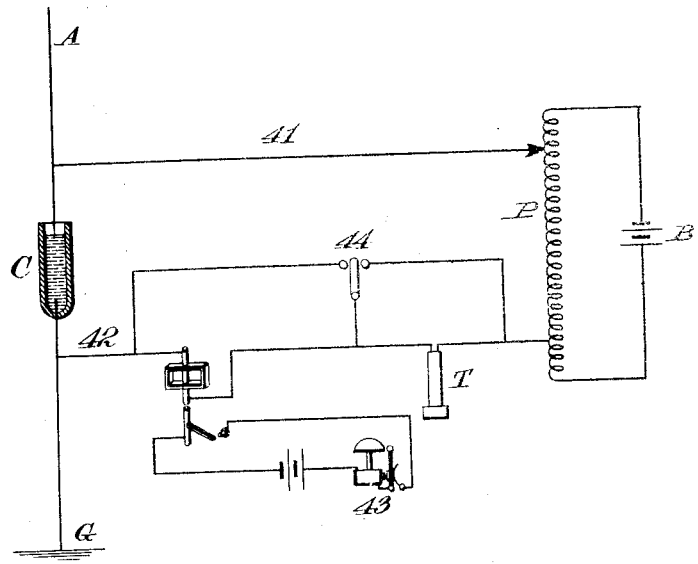
Figure 6:
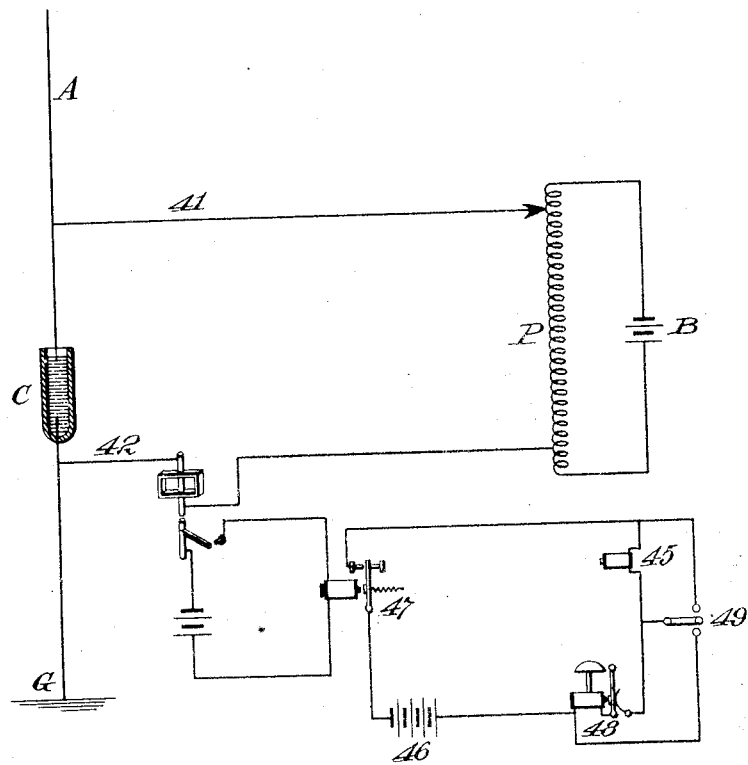

Figure 1 is a perspective view and partial section, illustrating diagrammatically the preferred form of the apparatus with the parts spread out for clearness of illustration. Fig. 2 is a similar view illustrating a modified form. Figs. 3 and 4 are elevations illustrating further modifications, and Figs. 5 and 6 are diagrams illustrating the use of my relay in connection with a polariphone-detector.

Referring to Fig. 1, 1 is the current-coil of the motor element, which is mounted upon the spindle 2 by means of a frame of non-conducting material, so as to avoid the damping effect of a conducting-frame and to make the motor element rapidly responsive. The coil 1 has a rotational movement in the field of the magnet N S. The position of the coil is controlled by springs 3 4, attached to the spindle 2, but insulated therefrom and having a set in opposite directions. The springs 3 4 also serve to connect the coil in circuit. The spindle 2 may be provided with an index 5. The coil 1 and its associated parts form the motor element of the relay. Below the spindle 2, and preferably in line with it, is mounted another spindle, 6, carrying at its lower end vanes 7 immersed in a liquid—such as mercury, glycerin, or some suitable oil—contained in a vessel 8. Above the vessel 8 the spindle 6 is provided with a cross-arm 9, which is connected at one end with the spindle 2 of the motor element by a light spring 10. The other end of the cross-arm 9 carries a stirrup 11, the upwardly-turned ends of which are provided with the contact 12 and the insulated stop 13, respectively. A contact-arm 14, attached to the spindle 2 of the motor element, projects downwardly between the contact 12 and stop 13. The arm 14 is insulated from the spindle 2 and is electrically connected with the spring 4. The spindle 6 and its associated parts form the contact element of the relay. The relation of the contact-arm 14 to the contact 12 and stop 13 may be adjusted by adjusting 12 and 13 or by adjusting the connection of the spring 10 with the arm 9, or in both ways. I prefer, however, to provide an additional adjustment in the form of a feeble spring 15, attached to the spindle 6 and having its outer end carried by an arm 16, which is movable about the axis to give the spring 15 the desired set. The spring 15 should be a spring sufficiently long to apply a practically constant directive force which is not materially affected by the rotation of the spindle 6. The spring 10 serves to keep the motor and contact elements in their normal mutual relation, with the circuit open between 12 and 14 for steady or slowly-varying currents. This spring 10, however, yields readily to any sudden movement of the motor element, carrying the arm 14 forward against the contact 12 and closing the local circuit. The cessation of the signal impulse results in the return of the motor element to its normal position, moving the arm 14 away from the contact 12 and opening the local circuit. The motor element is connected in the signaling-circuit by connections 17 18, running to the springs 3 and 4, respectively, while the contact-arm 14 and contact 12 are connected in the local circuit by means of connections 19 and 20, the former running to the spring 4 and the latter to the vessel 8.

In the modification shown in Fig. 2 the motor element is illustrated as one of the same character as that of the instrument shown in Fig. 1, having a coil 1 mounted upon a spindle 2 under control of springs 3 4, with which the connections 17 and 18 to the signaling-circuit are made. The spindle 6 of the contact element is placed below and in line with the spindle 2 of the motor element, as in the construction already described. With this spindle is connected a light spring 21, which serves to hold the contact element in its normal position. A contact-arm 22, carried by the spindle 6, plays between the contact 23 and the insulated stop 24. The spindle 6 carries at its upper end a vessel 25, containing a suitable viscous liquid, into which vessel depend vanes 26, carried by the spindle 2 of the motor element. The local circuit has one connection with the contact-arm 22 through the spring 21 and its other connection with the contact 23. Normally the arm 22 is held in contact with the insulated stop 24 if the relay operates as an open-circuit device. Any gradual movements of the motor element will be resisted by the spring 21 sufficiently to permit the vanes 26 to move in the viscous liquid without closing the local circuit between 22 and 23. Any sudden movement of the motor element, however, such as is produced by the passage of the signal impulse through the coil 1, turns the spindle 6 against the tension of the spring 21 and moves the arm 22 into contact with 23, closing the local circuit.

It is evident that in the forms shown in Figs. 1 and 2 the relay may act as a closed-circuit device, its normal position maintaining the local circuit closed, or both the stops 12 and 13 in one case and 23 and 24 in the other case may be conducting-stops and the relay employed to operate any suitable polarized device.

In Figs. 3 and 4 modifications are shown in which rectilinear movements are employed. In Fig. 3, 27 is a solenoid, which is connected in the signaling-circuit and which acts to move a light core 28, retracted by a spring 29. The core 28 may be supported by a long arm 30, pivoted at its outer end. Another pivoted arm, 31, carries a weight 32 if inertia is used as the retarding element or is connected with a suitable dash-pot if a viscous retarding element is employed. Between the core 28 and the weight 32 is a spring 33, whose ends are insulated. Contacts 34 and 35 are carried by the core 28 and weight 32, respectively, these contacts being located in the local circuit. The relation of the parts is intended to be such that for slow movements of the core 28 the spring 33 will cause the weight 32 to be correspondingly moved without closing the local circuit at the contacts 34 35; but for sudden movements of the core 28 the inertia of the weight 32 will be such that the spring 33 will be compressed sufficiently to close the local circuit at the contacts 34 35. In Fig. 4 the device employs a solenoid 27, a core 28, supported by an arm 30, and a retracting-spring 29, as in the instrument of Fig. 3. It also has an arm 31, which carries a dash-pot 36, in which works a plunger 37, connected with the core 28. The dash-pot 36 carries a movable contact 38, placed in line with a stationary contact 39, these contacts 38 and 39 being in the local circuit. The movement of the dash-pot 36 to the left, or in the direction to close the circuit at the contacts 38 39, is opposed by a spring 40. During the slow movements of the solenoid-core 28 the plunger 37 will move in the dash-pot 36, compressing the spring 40 slightly, but not sufficiently to close the local circuit at the contacts 38 and 39; but any sudden movement of the core 28 to the left causes the dash-pot 36 to move, closing the local circuit at 38 39.

The use of my improved relay with the polariphone-detector of my application referred to is illustrated in Figs. 5 and 6, in which A is the antenna, C the electrolytic cell having minute anode, and G the ground. The cell C is shunted by the polarizing-circuit 41 42, including the battery B and potentiometer P. The cell may be connected in a tuned resonant circuit instead of in line between the antenna and ground, as will be well understood. The motor element of the relay is connected in the circuit 41 42. In Fig. 5 the relay is shown as controlling a local circuit including a call-bell 43. A telephone or other receiving instrument T is also located in the circuit 41 42 and a switch 44 may be employed for shunting either the telephone or the relay. In Fig. 6 the signal-receiving instrument may be a telegraph recorder or a sounder, (represented by the magnet 45.) This instrument is connected in a circuit supplied by a battery 46 and controlled by an ordinary Morse relay 47. The circuit of the Morse relay 47 is controlled by my floating relay, which is located in the polarizing-circuit 41 42. In circuit with the battery 46 may also be placed a call-bell 48, and a switch 49 may be employed to shunt the bell 48 or the sounder or recorder 45. Variations in the conditions of the cell C or adjustments of the potentiometer P will produce changes in the value of the steady current passing from the battery B through the circuit 41 42. These variations are automatically compensated for by my floating relay without deranging its adjustment. The passage of the signal impulses through the cell C causes the complete or partial depolarization of that cell and produces a sudden increase of current in the circuit 41 42, which moves the motor element of the floating relay suddenly, causing the closure of the local circuit controlled by it.

In all forms of the apparatus described the retarding device exerts its force in such manner as to permit or produce relative movement of the contacts in response to sudden movements of the motor element, while a spring tending to hold the contacts against relative movement exerts a sufficient force to overcome the effort of the retarding device when the movement or variation in movement of the motor element is slow or gradual. When the retarding device is a simple inertia device, it acts to prevent movement or acceleration, but ceases to act when it has itself acquired the propelling speed. A viscous retarding device or a Foucault disk, on the other hand, acts only after acquiring movement. The preferred form of retarding device for my relay is one that combines both inertia and viscosity, such as vanes having a rotational movement in a heavy liquid or a sufficiently heavy Foucault disk, since such a device not only acts to prevent movement or acceleration, but continues to exert a retarding effect after acquiring the propelling speed.

My relay is useful for relaying signal impulses superimposed upon a steady current even if the latter does not change under conditions of use, since it will accommodate itself to any changes in the standard value of the steady current without deranging its adjustment.

What I claim is—

1. A relay for variable currents wherein are combined means responsive to the current utilizing the sudden variations which are superimposed upon a comparatively steady current and neglecting gradual variations in the current, substantially as set forth.

2. A relay for signal impulses superimposed upon a comparatively steady current, wherein are combined contacts, and means for changing the relative position of the contacts by sudden variations in current only, substantially as set forth.

3. A signal-relay wherein are combined a motor element, circuit-controlling contacts operated thereby, and means for causing the contacts to respond only to sudden movements of the motor element, substantially as set forth.

4. A signal-relay wherein are combined a current-responsive element, a circuit-controlling element, and a coupling between the two elements which effectively transmits sudden movements of the current-responsive element while excluding or absorbing gradual movements, substantially as set forth.

5. In a signal-relay, the combination of a motor element, a contact element, and a retarding device controlling the movement of the contacts by the motor element, whereby the contacts will be moved relatively only by sudden movements of the motor element, substantially as set forth.

6. A signal-relay wherein are combined a motor element, a set of floating contacts and means modifying the action of the motor element on the contacts whereby the floating contacts are moved together without change in their relation to each other by slow movements of the motor element and are moved relatively to each other by sudden movements of the motor element, substantially as set forth.

7. A signal-relay wherein are combined a motor element, a contact carried by the motor element, a contact element carrying a second contact driven by the motor element through a resilient connection, and a retarding device connected with the contact element, whereby the mutual relation of the contacts will be changed only by sudden movements of the motor element, substantially as set forth.

8. A signal-relay wherein are combined a motor element comprising a coil suspended in a magnetic field, and contacts controlled thereby so as to respond only to sudden movements of the coil, substantially as set forth.

9. A signal-relay wherein are combined a motor element comprising a coil suspended in a magnetic field, contacts moved relatively by the motor element, and a retarding device controlling the movement of the contacts so that they will be moved relatively only by sudden movements of the coil, substantially as set forth.

10. A signal-relay wherein are combined a motor element comprising a coil suspended in a magnetic field and carrying one contact, a contact element connected with and moved by the motor element through a resilient connection and carrying a second contact, and a retarding device connected with the contact element, whereby the contacts will be moved relatively only by sudden movements of the motor element, substantially as set forth.

11. A signal-relay wherein are combined a motor element, contacts moved by the motor element and responding only to sudden movements of the motor element, and means for adjusting the normal relative position of the contacts, substantially as set forth.

12. A signal-relay wherein are combined a motor element carrying one contact, a contact element driven by the motor element through a yielding connection and carrying a second contact, a retarding device connected with the contact element, and an adjustable spring for giving directive force to the contact element, substantially as set forth.

13. A signal-relay wherein are combined a motor element, a contact element moved relatively by the motor element, and a controlled yielding connection between the motor and contact elements whereby the contacts will be moved relatively only by sudden movements of the motor element, substantially as set forth.

14. A signal-relay wherein are combined a motor element, contacts moved relatively thereby, a retarding device permitting sudden relative movements of the contacts, and a spring tending to hold the contacts against relative movement, substantially as set forth.

15. A signal-relay wherein are combined a motor element, contacts moved relatively thereby, a spring tending to hold the contacts in their normal mutual relation, and a retarding device opposing the effort of the spring with a force depending both upon acceleration and velocity, substantially as set forth.

16. A signal-relay wherein are combined a motor element, contacts moved relatively thereby, and a retarding device permitting sudden but not gradual relative motion of the contacts, such retarding device comprising a liquid dash-pot, substantially as set forth.

17. A signal-relay wherein are combined a motor element, contacts moved relatively thereby, and a retarding device permitting sudden but not gradual relative motion of the contacts, such retarding device comprising vanes having a rotational movement in liquid, substantially as set forth.

18. A signal-relay wherein are combined a motor element and a contact element having rotational movements on axes in line with each other, with contacts and a retarding device permitting the sudden relative movement of the contacts but not their gradual relative movement, substantially as set forth.

19. A signal-relay wherein are combined a motor element and a contact element having rotational movements on axes in line with each other, with contacts and a retarding device permitting the sudden relative movement of the contacts but not their gradual relative movement, such retarding device comprising a rotary dash-pot concentric with the axes of the motor and the contact elements, substantially as set forth.

20. A signal-relay wherein are combined a motor element and a contact element having rotational movements on axes in line with each other, with contacts, a retarding device permitting the sudden relative movement of the contacts, such retarding device comprising a rotary dash-pot concentric with the axes of the motor and the contact elements, and a spring tending to hold the contacts against relative movement, substantially as set forth.

21. A signal-relay wherein are combined a motor element controlled by mutually-opposed springs, and contacts controlled by said motor element so as to respond only to sudden movements of the motor element, substantially as set forth.

22. A signal-relay wherein are combined a motor element controlled by mutually-opposed springs, contacts moved relatively by the motor element, and a retarding device controlling the movement of the contacts so that they will be moved relatively only by sudden movements of the motor element, substantially as set forth.

23. A signal-relay wherein are combined a motor element controlled by mutually-opposed springs and carrying one contact, a contact element connected with and moved by the motor element through a resilient connection and carrying a second contact, and a retarding device connected with the contact element, whereby the contacts will be moved relatively only by sudden movements of the motor element, substantially as set forth.

24. A wireless-telegraph receiver wherein are combined a detector of electrical oscillations, a local circuit, and a relay in said local circuit which responds to sudden current variations in the local circuit caused by received signal impulses and neglects steady or slowly-varying currents in the local circuit, substantially as set forth.

25. A wireless-telegraph receiver wherein are combined an electrolytic detector, a local circuit, and a relay in said local circuit which responds to sudden current variations in the local circuit caused by received signal impulses and neglects steady or slowly-varying currents in the local circuit, substantially as set forth.

26. A wireless-telegraph receiver wherein are combined a detector of electrical oscillations, a local circuit, and a relay in said local circuit comprising a motor element, circuit-controlling contacts operated thereby, and means for causing the contacts to respond only to sudden movements of the motor element, substantially as set forth.

This specification signed and witnessed this 10th day of November, 1904.

FREDERICK K. VREELAND.

Witnesses:
JNO. ROBT. TAYLOR,
JOHN L. LOTSCH.